(12) United States Patent
Preston (10) Patent No.: US 8,616,268 B2
(45) Date of Patent: Dec. 31, 2013

(54) MOVABLE CONSTANT TEMPERATURE CIRCULATOR ASSEMBLY

(75) Inventor: Philip Preston, Northfield, IL (US)

(73) Assignee: Preston Industries, Inc., Niles, IL (US)

( * ) Notice: Subject to any disclaimer, the term of this patent is extended or adjusted under 35 U.S.C. 154(b) by 513 days.

(21) Appl. No.: 12/837,220

(22) Filed: Jul. 15, 2010

(65) Prior Publication Data

US 2012/0012208 A1   Jan. 19, 2012

(51) Int. Cl.
*B01L 7/02* (2006.01)
*F16M 11/08* (2006.01)

(52) U.S. Cl.
USPC .... 165/108; 248/349.1; 248/922; 361/679.02

(58) Field of Classification Search
USPC ........... 137/334, 340, 551; 251/291; 220/565, 220/562, 601, 640, 646, 639; 403/329, 348, 403/353; 248/349.1, 922; 165/108; 361/679.02, 679.21, 679.61
See application file for complete search history.

(56) References Cited

U.S. PATENT DOCUMENTS

| | | | | |
|---|---|---|---|---|
| 2,187,888 | A | * | 1/1940 | Nachumsohn ................ 219/417 |
| 2,950,893 | A | * | 8/1960 | McLarney et al. ......... 248/349.1 |
| 4,191,348 | A | * | 3/1980 | Holwerda ................. 244/134 C |
| 4,547,027 | A | * | 10/1985 | Scheibenreif ................... 439/13 |
| 4,796,842 | A | * | 1/1989 | Hamada et al. ............ 248/186.2 |
| 4,946,127 | A | * | 8/1990 | Kulaga .......................... 248/551 |
| 5,206,790 | A | | 4/1993 | Thomas et al. |
| 5,243,434 | A | * | 9/1993 | Nodama ....................... 348/827 |
| 5,526,734 | A | * | 6/1996 | Harrison ........................ 99/339 |
| 6,345,644 | B1 | * | 2/2002 | McLeod ....................... 137/340 |
| 7,245,274 | B2 | | 7/2007 | Schedivy |
| 7,510,241 | B2 | | 3/2009 | Nathan et al. |
| 8,240,944 | B2 | * | 8/2012 | Chang .......................... 403/348 |
| 2002/0015585 | A1 | | 2/2002 | Jensen et al. |
| 2003/0116556 | A1 | * | 6/2003 | Li ................................. 219/433 |
| 2003/0146096 | A1 | | 8/2003 | Cong et al. |
| 2004/0216862 | A1 | * | 11/2004 | Jucheim ...................... 165/11.1 |
| 2009/0101785 | A1 | | 4/2009 | Jan et al. |
| 2009/0314912 | A1 | * | 12/2009 | Whitley et al. ............ 248/299.1 |

FOREIGN PATENT DOCUMENTS

DE   203 06 059   7/2003
WO   WO2005037166   4/2005

* cited by examiner

*Primary Examiner* — John Rivell
(74) *Attorney, Agent, or Firm* — Vedder Price P.C.

(57) ABSTRACT

A constant temperature circulator assembly may include a circulator head assembly having a fixed display and a base ring assembly adapted for connection to a container wherein the circulator head assembly movably engages the base ring assembly so that an orientation of the fixed display may be selectively adjusted with respect to the base ring assembly.

17 Claims, 11 Drawing Sheets

MOVABLE CONSTANT TEMPERATURE CIRCULATOR ASSEMBLY

FIELD OF THE DISCLOSURE

The present disclosure is related to a constant temperature circulator assembly, and more particularly, to a constant temperature assembly including, among other things, a plurality of selectable display orientations.

BACKGROUND

Current circulating baths generally consist of a container having a fluid reservoir, a reservoir well, a reservoir lid, a drain port and an air filter; and a control module that is fixed to the deck of the container above the reservoir well. The control module is a self contained system that is designed to, among other things, circulate fluid and precisely control the temperature of that fluid. As currently designed, control modules are rectangular shaped boxes that hold a pump, control electronics, a safety thermostat, power components and display equipment. These components are disposed above the fluid in the reservoir. Control modules also include a heating or cooling element which is immersed in the fluid sought to be controlled. When immersed, the heating or cooling elements extend from the deck of the container, through the reservoir well and into the fluid.

Existing control modules are fixed to the deck of a circulating bath using a threaded fastener and appropriate tools. As such, existing control modules provide a fixed angle of view relative to the fluid reservoir. To change the angle of view of an existing control module, the fastener must be removed and the control module can be re-oriented in one of four preselected positions located in spaced ninety degree (90°) locations about the perimeter of the reservoir well. Once repositioned, the control module must be re-attached to the circulating bath using the fastener and appropriate tools.

The disadvantages of current circulator baths outlined above, among other things, are overcome by a constant temperature circulator assembly that provides a plurality of selectable display orientations that do not require the use of any tools or removal of the circulator head assembly from the container for repositioning, such that the circulator head assembly can be locked in a selected position and subsequently unlocked, rotated to a different position and locked in the different selected position while the temperature and circulating components of the circulator head assembly remain in contact with the fluid in the container.

In one aspect of the present disclosure, a constant temperature circulator assembly may include a circulator head assembly having a fixed display, a container for a fluid, and a base ring assembly connected to the container, wherein the circulator head assembly movably engages the base ring assembly so that an orientation of the fixed display may be selectively adjusted with respect to the base ring assembly.

Therefore, there is a need in the art for a constant temperature circulator assembly that overcomes the disadvantages of the prior art and provides the advantages as described in this disclosure.

In other aspects of the present disclosure, the base ring assembly may includes a base ring having a central opening and a channel circumferentially disposed about the central opening including a mounting portion having a slot configured for locking engagement with a standoff disposed on the container. The base ring may also include an outer wall having a radially extending release tab that facilitates rotation of the base ring to selectively couple the slot and the standoff.

The base ring may further include a latch mechanism having a latch movable connected to the base ring, preferably a pivotal connection to the outer wall, and a biasing element, preferably a spring, that biases the latch mechanism toward the central opening. The latch mechanism may include a handle that extends beyond the outer wall of the base ring to facilitate selective engagement of a tab disposed on the latch and one of a plurality of notches formed in a circular projection on the circulator head assembly when the circular projection is disposed in the channel.

In further aspects of the present disclosure, the constant temperature circulator assembly may include a circulator head assembly having a fixed display and a base ring assembly adapted for connection to a container, wherein the circulator head assembly movably engages the base ring assembly so that an orientation of the fixed display may be selectively adjusted with respect to the base ring assembly. The selective adjustment of the orientation may be through at least one hundred eighty degrees (180°) of rotation.

BRIEF DESCRIPTION OF THE DRAWINGS

The following disclosure as a whole may be best understood by reference to the provided detailed description when read in conjunction with the accompanying drawings, drawing description, abstract, background, field of the disclosure, and associated headings. Identical reference numerals when found on different figures identify the same elements or a functionally equivalent element. The elements listed in the abstract are not referenced but nevertheless refer by association to the elements of the detailed description and associated disclosure.

DETAILED DESCRIPTION

The present invention is not limited to the particular details of the apparatus depicted, and other modifications and applications may be contemplated. Further changes may be made in the device without departing from the true spirit of the scope of the invention herein involved. It is intended, therefore, that the subject matter in this disclosure should be interpreted as illustrative, not in a limiting sense.

Figure 1:
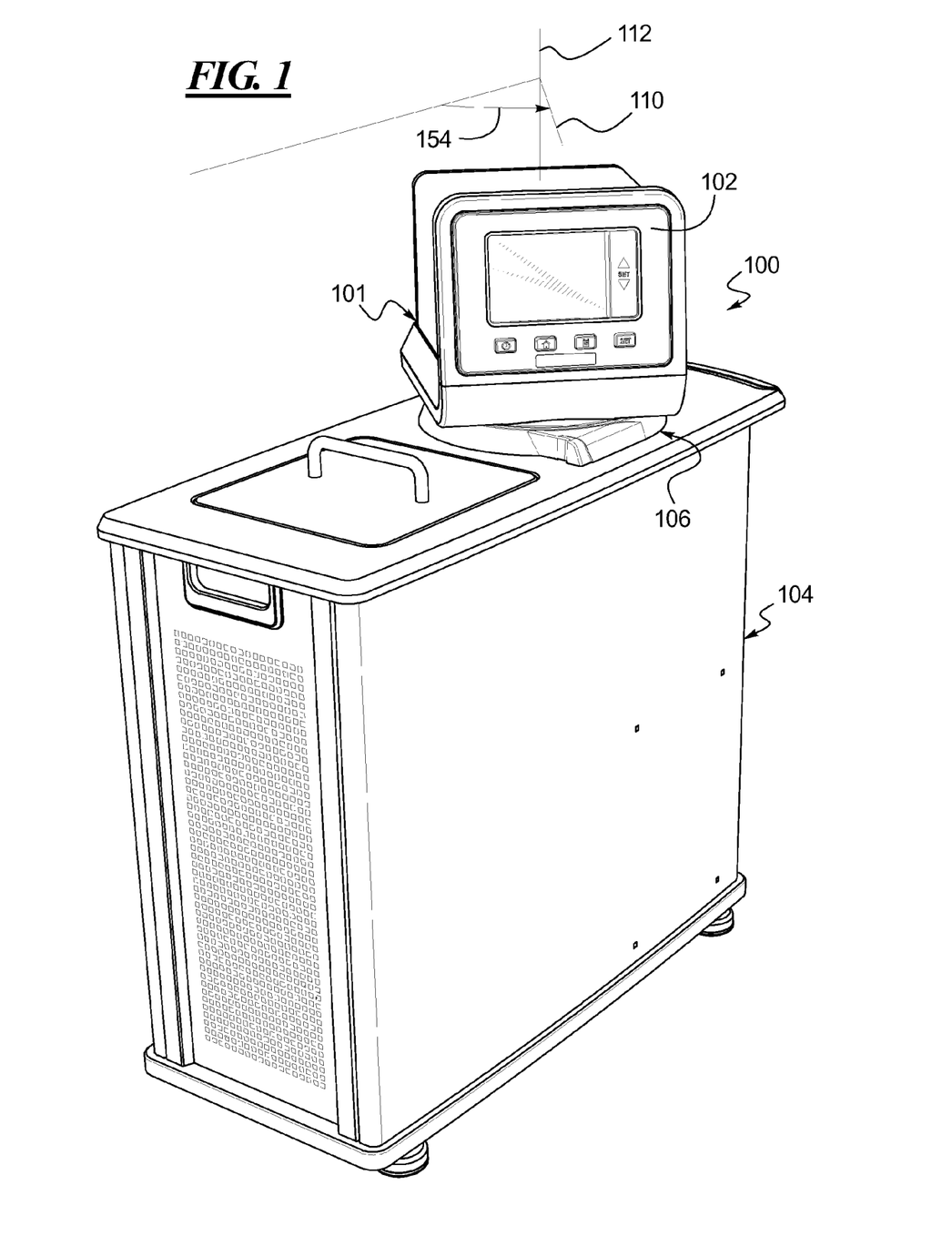
FIG. 1 is a perspective view of a constant temperature circulator assembly in accordance with one embodiment of the present disclosure, illustrating an embodiment of an orientation of a fixed display.

FIG. 1 is a perspective view of a constant temperature circulator assembly 100 in accordance with one embodiment of the present disclosure. The constant temperature circulator assembly 100 may include, in one embodiment, a circulator head assembly 101 having a fixed display 102, a container 104 and a base ring assembly 106. The base ring assembly 106 is preferably configured to facilitate movable engagement of the circulator head assembly 101 with the container 104 so that an orientation 110 of the fixed display 102 may be selectively adjusted with respect to the base ring assembly 106. Preferably, the orientation 110 of the fixed display 102 is selectively adjustable about an axis of rotation 112. It is within the teachings of the present disclosure that the container 104 may be any suitable vessel configured to facilitate connection of the base ring assembly 106 as described herein.

Figure 2:
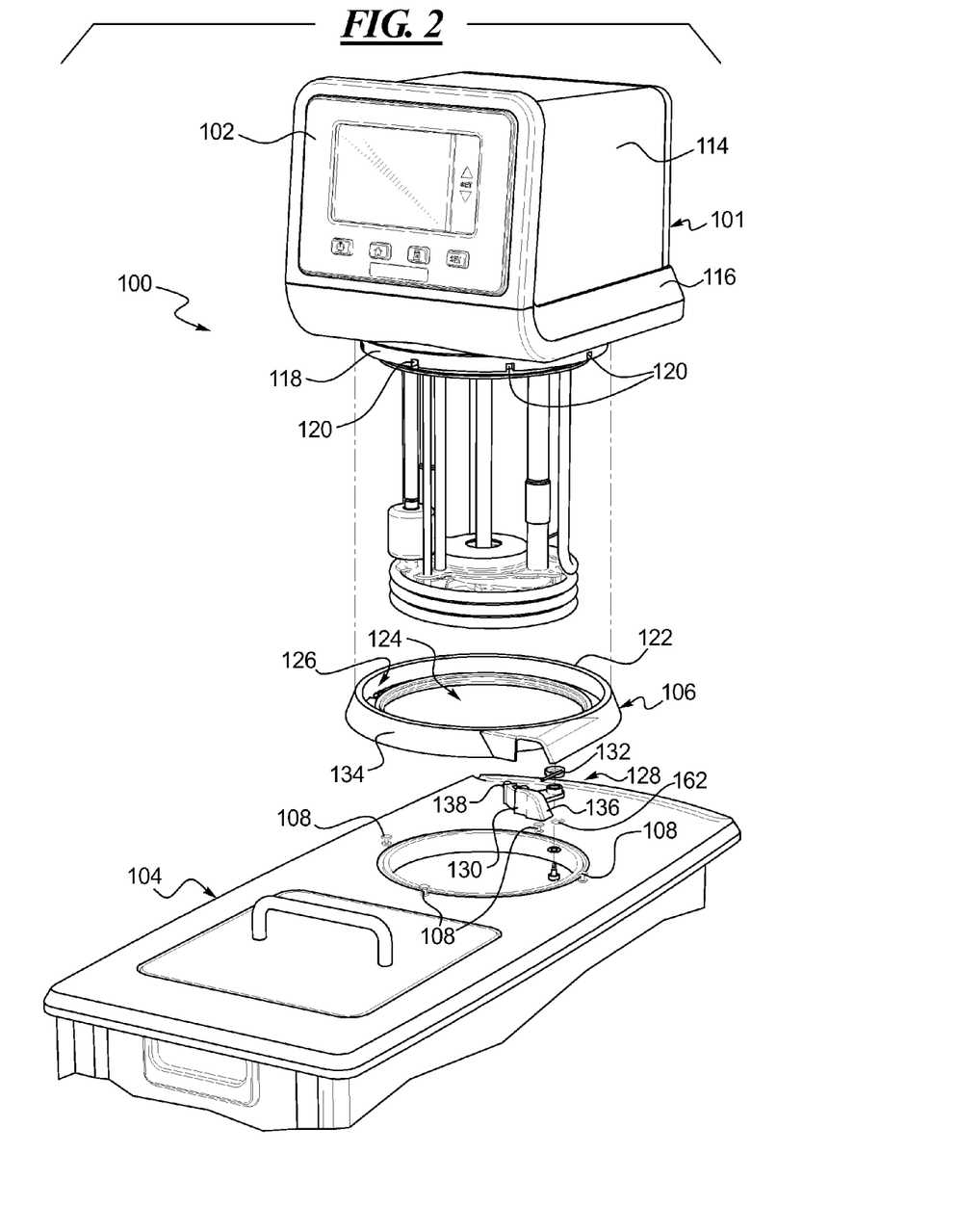
FIG. 2 is an exploded view of the constant temperature circulator assembly of FIG. 1.

FIG. 2 is an exploded view of the constant temperature circulator assembly 100 of FIG. 1, illustrating the circulator head assembly 101, base ring assembly 106 and the container 104. The circulator head assembly 101 may include the fixed display 102 connected to or formed as part of a housing 114 that may also include a base 116. In one embodiment, the base 116 may include a projection 118 having a plurality of notches 120 formed therein at spaced locations about the outer perimeter of the projection 118. It is within the teachings of the present disclosure that the projection 118 may have any suitable configuration. Preferably, in one embodiment, the projection 118 has a generally circular configuration. The remainder of the circulator head assembly 101 otherwise may have a conventional configuration.

The base ring assembly 106 may include a base ring 122 including a central opening 124 and a channel 126 circumferentially disposed about the central opening 124 as may be defined by and between a lip 140 and an inner wall 142. Preferably, each of the base ring 122, central opening 124, channel 126, lip 140 and inner wall 142 may have any suitable configuration necessary to provide the functionality as described in this disclosure, such as generally circular. In one embodiment, the central opening 124, channel 126, lip 140 and inner wall 142 may be configured complementarily to the projection 118.

The base ring 122 may include a latch mechanism 128 that may include a latch 130 movably connected to the base ring 122 and a biasing element 132. In one embodiment, the latch 130 may be pivotally connected to an outer wall 134 of the base ring 122 and biased toward the central opening 124 by the biasing element 132. The latch 130 may also include a handle 136 that may extend beyond the outer wall 134 of the base ring 122 to facilitate selective engagement of a tab 138 disposed on the latch 130 and one of the plurality of notches 120 formed in the projection 118 on the circulator head assembly 101 when the projection 118 is disposed adjacent the channel 126. It is within the teachings of the present disclosure that the projection 118 may be received within the channel 126, disposed sufficiently adjacent the channel 126 in order to provide the intended functionality or any other suitable configuration.

The container 104 may include a standoff 108 connected to and extending from the container 108 in order to facilitate a locking interface with the base ring assembly 106, as will be described herein. It is within the teachings of the present disclosure that the standoffs 108 may be disposed in any suitable location with respect to the container 104 in order to provide the intended functionality.

Figure 3A:
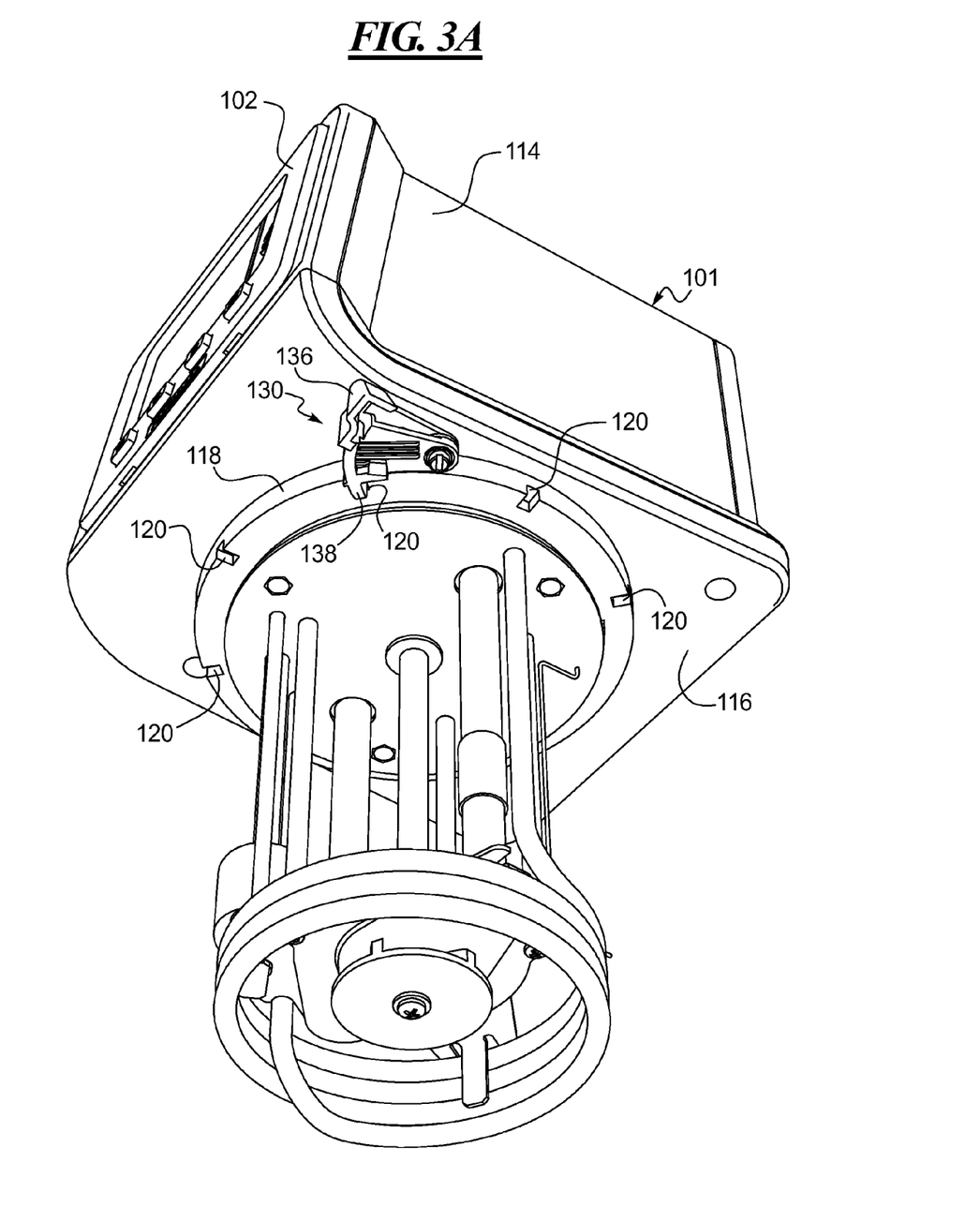
FIG. 3A is a bottom perspective view of one embodiment of a circulator head assembly of the constant temperature circulator assembly of FIG. 1.

FIG. 3A is a bottom perspective view of one embodiment of the circulator head assembly 101 of the constant temperature circulator assembly 100 of FIG. 1. In this embodiment, the circulator head assembly 101 includes the fixed display 102 connected to or formed as part of the housing 114 and the base 116, likewise connected to or formed as part of the housing 114. The generally circular projection 118 is also likewise connected to or formed as part of the base 116 and has a plurality of notches 120 formed therein at spaced locations about the outer perimeter of the circular projection 118. The latch 130 is shown without the remainder of the base ring assembly in order to clearly illustrate the interface of the tab 138 with one of the notches 120. As will be described herein, one of ordinary skill in the art will recognize that actuation of the handle 136 will facilitate engagement and disengagement of the tab 138 with any one of the selected notches 120.

Figure 3B:
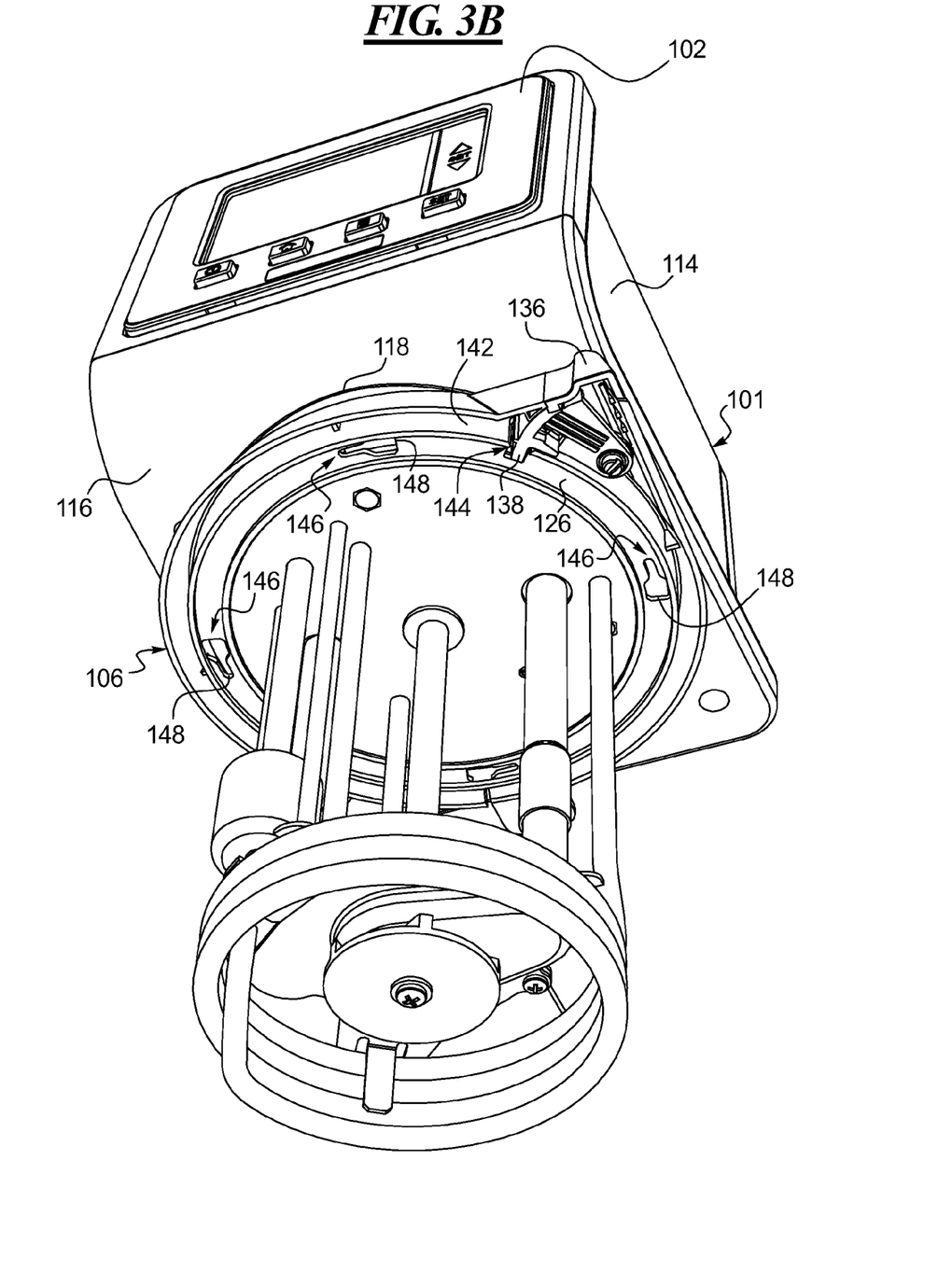
FIG. 3B is a bottom perspective view of another embodiment of a circulator head assembly of the constant temperature circulator assembly of FIG. 1.

FIG. 3B is a bottom perspective view of another embodiment of a circulator head assembly 101 of the constant temperature circulator assembly 100 of FIG. 1, that is similar to FIG. 3A except that the remainder of the base ring assembly 106 is illustrated. A recess 144 may be defined in the inner wall 142 and channel 126 to facilitate engagement of the tab 138 with any one of the selected notches 120. The channel 126 may also include a mounting portion 146 that may have a slot 148 configured to facilitate locking engagement between the base ring assembly 106 and the standoff 108 disposed on the container 104.

Figure 4A:
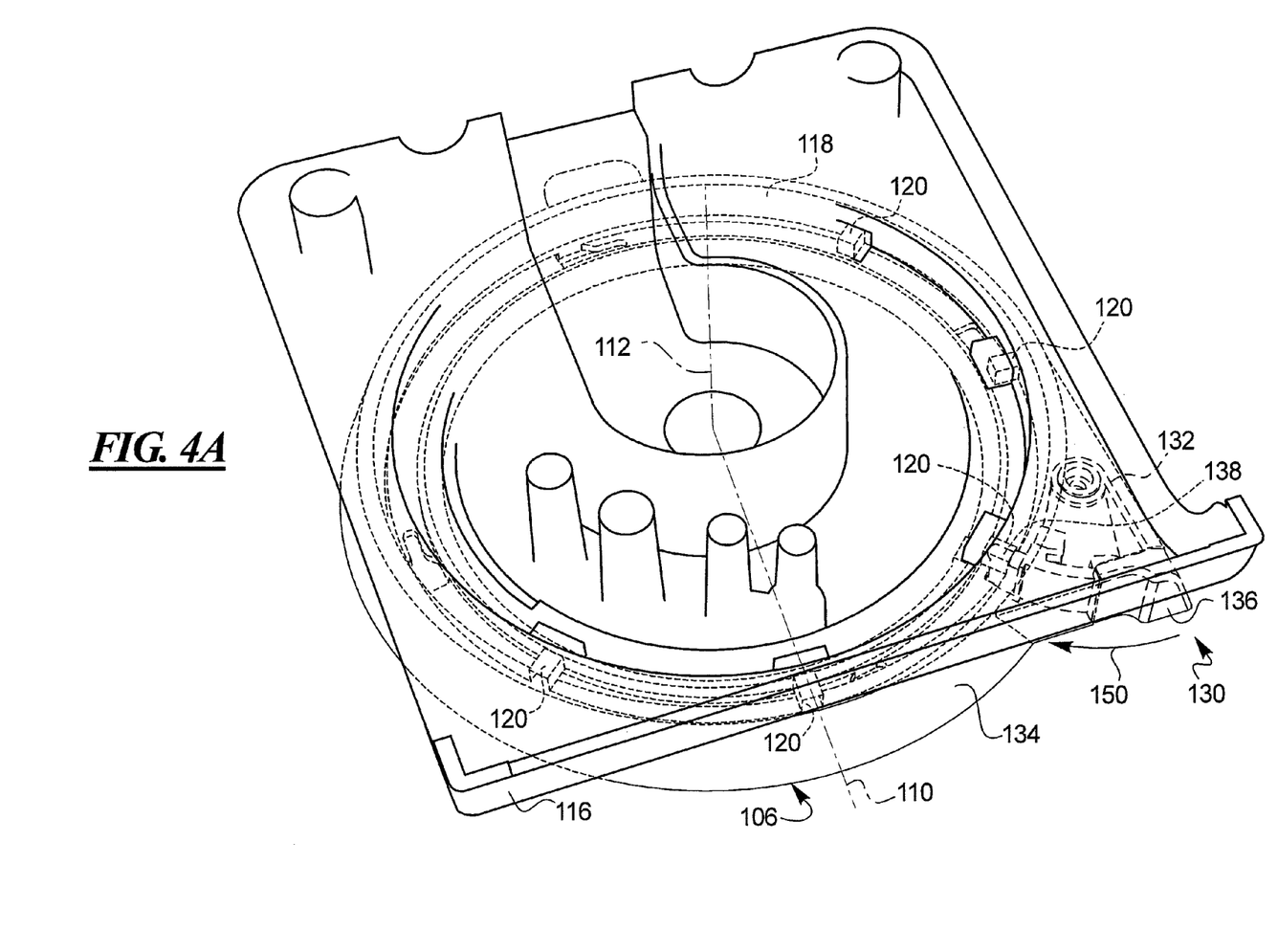
FIG. 4A is top perspective partially cut away view of one embodiment of a circulator head assembly of the constant temperature circulator assembly of FIG. 1.

FIG. 4A is top perspective partially cut away view of one embodiment of a circulator head assembly 101 of the constant temperature circulator assembly 100 of FIG. 1. In this embodiment, the handle 136 on the latch 130 of the base ring assembly 106 is not actuated against the biasing element such that the handle 136 is normally biased in the direction indicated by arrow 150, which is inwardly toward the axis of rotation 112. The tab 138 engages one of the plurality of notches 120 disposed about the outer circumference of the projection 118 from the base 116.

Figure 4B:
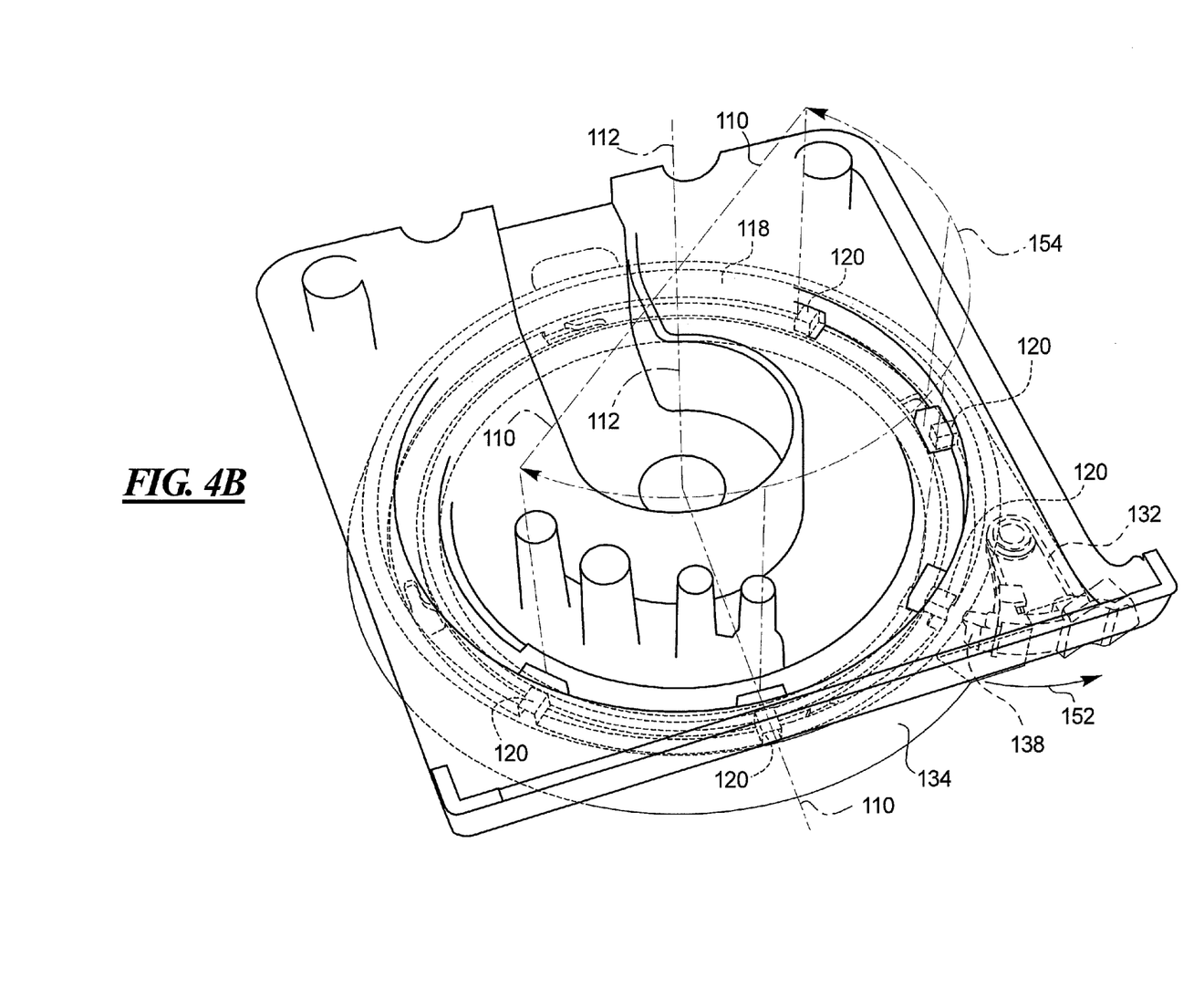
FIG. 4B is a top perspective partially cut away view of another embodiment of a circulator head assembly of the constant temperature circulator assembly of FIG. 1.

FIG. 4B is a top perspective partially cut away view of another embodiment of a circulator head assembly 101 of the constant temperature circulator assembly 100 of FIG. 1. In this embodiment, the handle 136 on the latch 130 of the base ring assembly 106 is actuated against the biasing element 132 such that the handle 136 is moved in the direction indicated by arrow 152, which is outwardly from the axis of rotation 112. The tab 138 disengages one of the plurality of notches 120 disposed about the outer circumference of the projection 118 from the base 116 so that the base 116 may be moved or rotated through the range of orientation adjustment as indicated by arrow 154 to any one of the selected plurality of notches 120. One of ordinary skill in the art will recognize that the range of orientation adjustment 154 may be up to and including three hundred sixty degrees (360°) for a circular projection 118 or any other suitable configuration. In the embodiment shown, the selective range of adjustment 154 of the orientation 110 is through at least 180 degrees of rotation.

Figure 5:
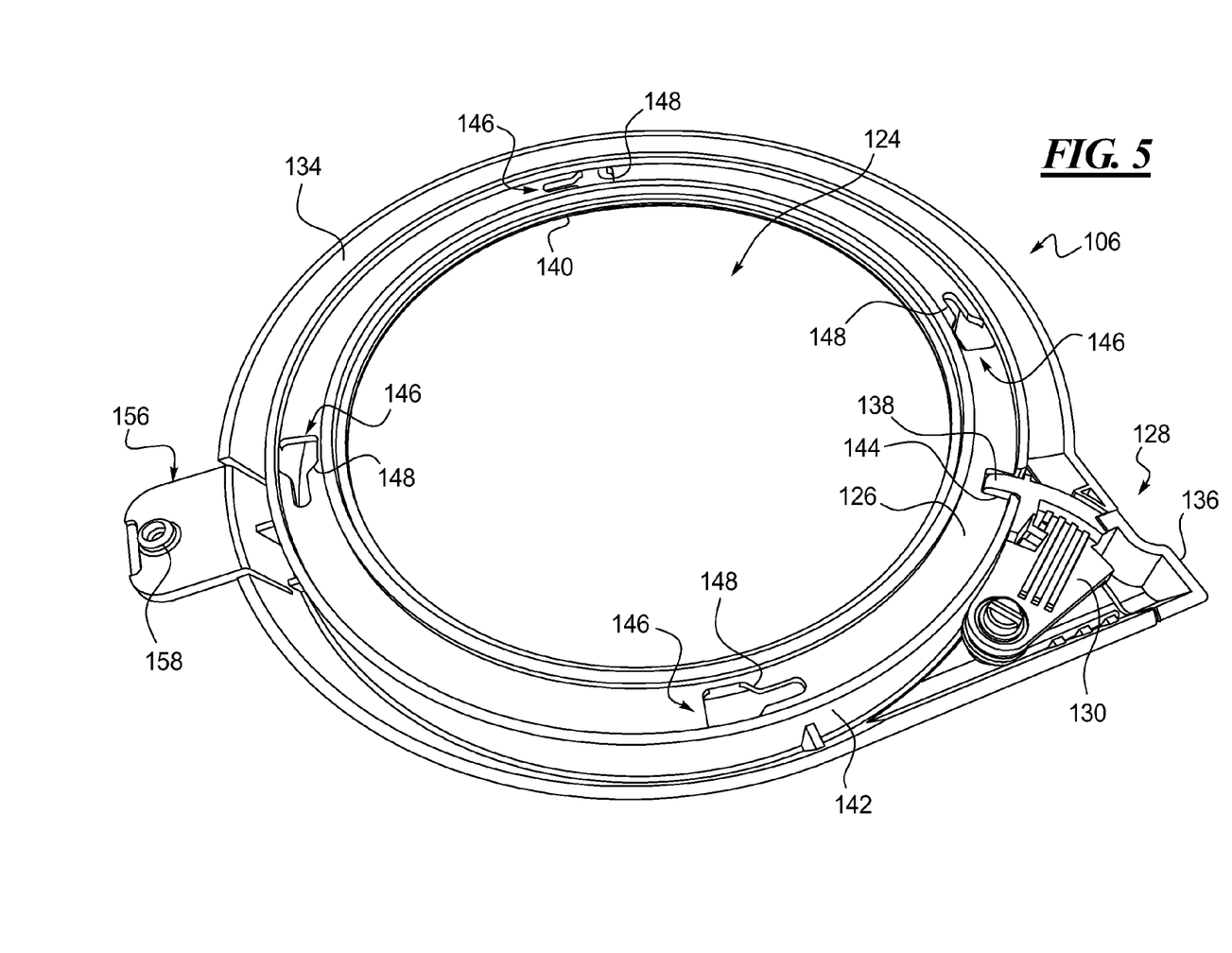
FIG. 5 is a bottom perspective view of one embodiment a base ring assembly of the constant temperature circulator assembly of FIG. 1.

FIG. 5 is a bottom perspective view of one embodiment a base ring assembly 106 of the constant temperature circulator assembly 100 of FIG. 1. In this embodiment, the base ring assembly 106 includes the base ring 122 that has the central opening 124, the channel 126 circumferentially disposed about the central opening 124 as defined by and between the lip 140 and the inner wall 142. This base ring 122 also has the latch mechanism 128 having the latch 130 pivotally connected to an outer wall 134 of the base ring 122 at a boss 160 and biased toward the central opening 124 by the biasing element 132 (see FIGS. 4A and 4B). The latch 130 also includes the handle 136 to facilitate selective engagement of the tab 138 disposed on the latch 130 and one of the plurality of notches 120 formed in the projection 118 on the circulator head assembly 101 when the projection 118 is disposed adjacent the channel 126 and the recess 144. The base ring 122 may also include a release tab 156 that extends radially from the outer wall 134 to facilitate rotation of the base ring 122 to selectively couple the slot 148 disposed in a mounting portion 146 of the channel 126 and the standoff 108 disposed on the container 104. In one embodiment, a button 158 may be disposed on the release tab 156 configured to engage an opening (162, see FIG. 2) in the container 104 in a detent manner so as to positively indicate when the base ring 122 is secured to the container 104 and maintain the base ring 122 in such secure connection when the circulator head assembly 101 is moved to selected orientations with respect to the base ring assembly 106. It is within the teachings of the present disclosure that the button 158 and opening 162 may have any suitable configuration to provide the intended functionality and preferably are complementarily configured.

Figure 6A:
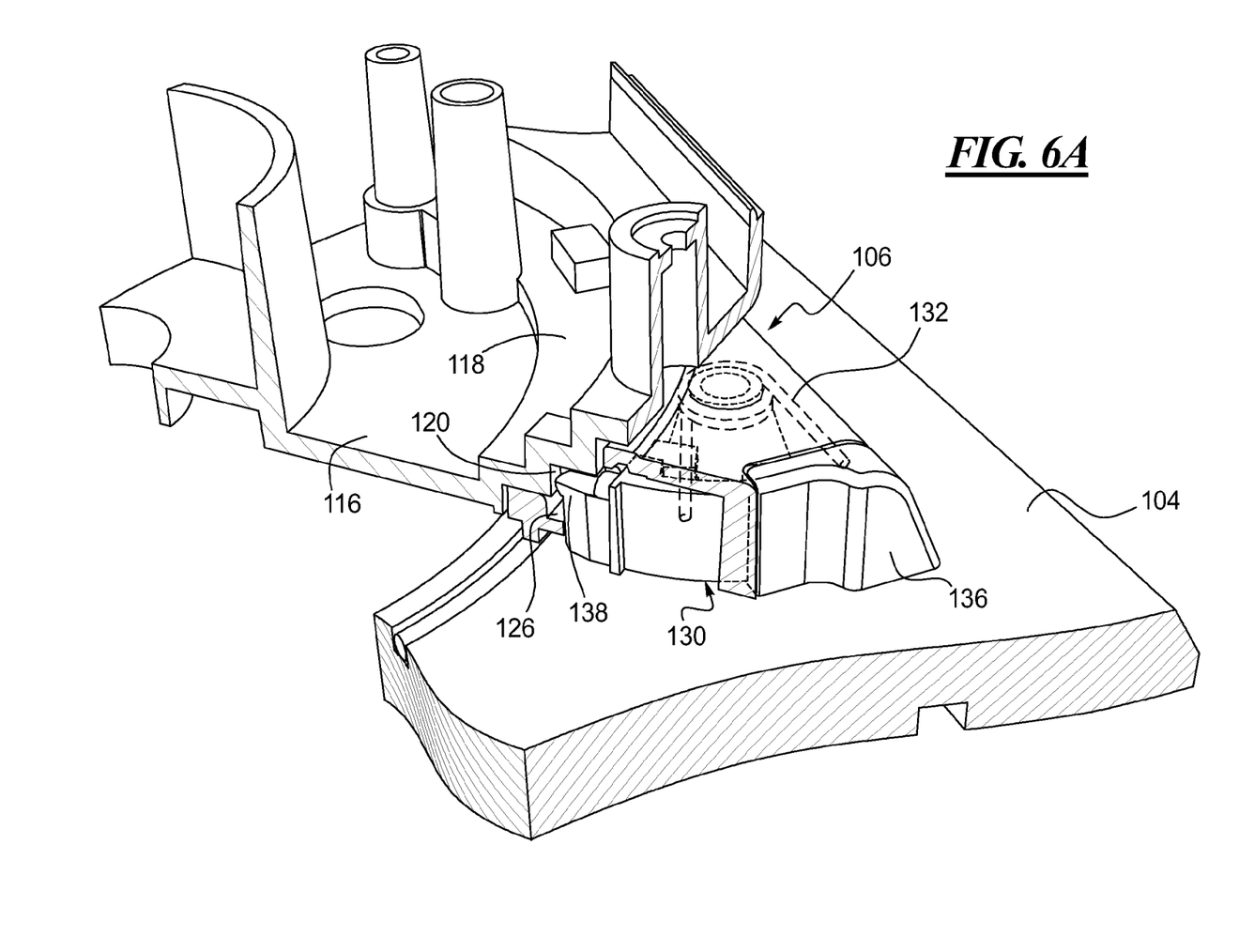
FIG. 6A is a partial cut away view of one embodiment of the constant temperature circulator assembly of FIG. 1.

FIG. 6A is a partial cut away view of one embodiment of the constant temperature circulator assembly 100 of FIG. 1. In this embodiment, the handle 136 on the latch 130 of the base ring assembly 106 is not actuated against the biasing element 132 such that the handle 136 is normally biased in an inwardly direction. The tab 138 engages one of the plurality of notches 120 disposed about the outer circumference of the projection 118 from the base 116.

Figure 6B:
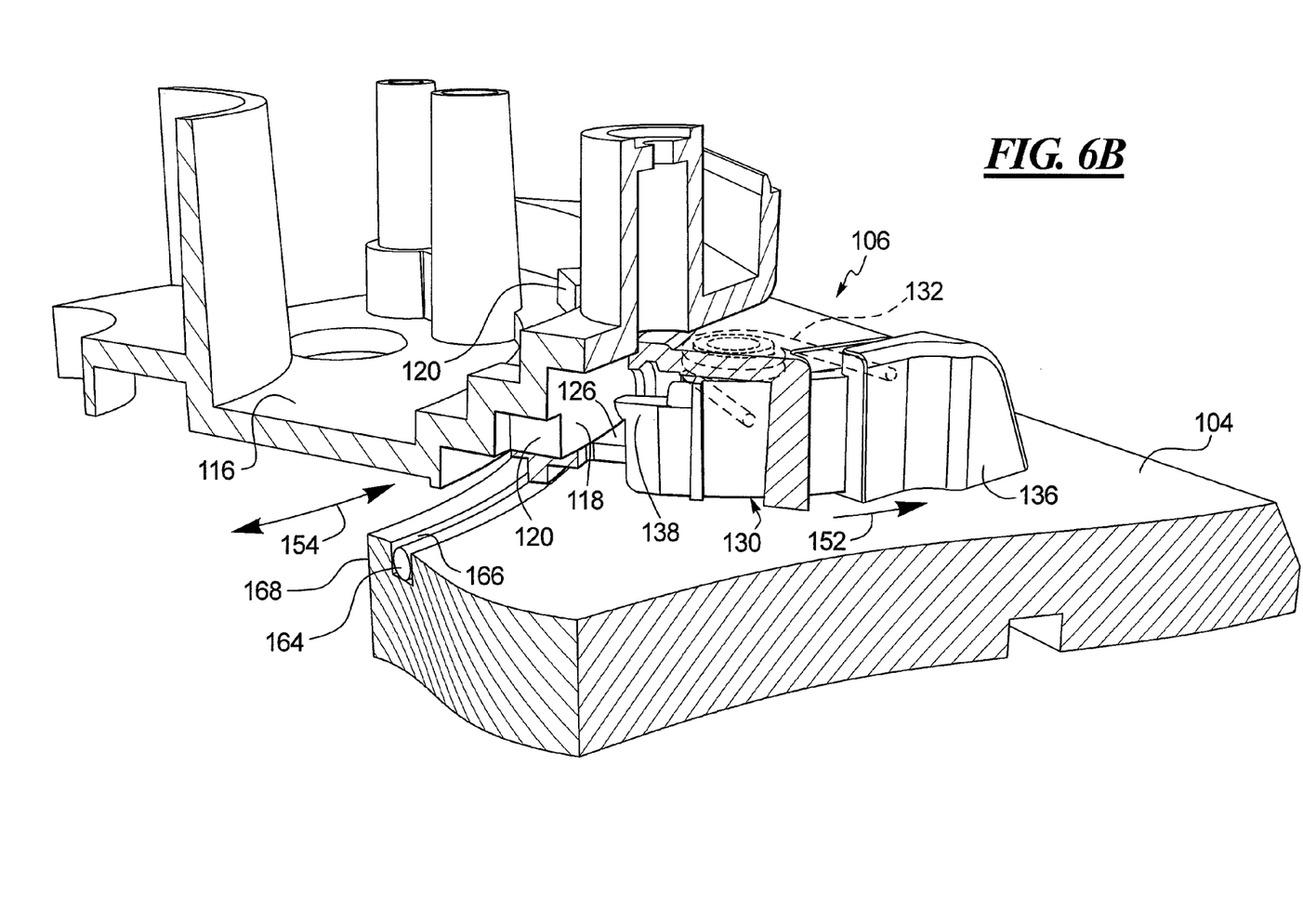
FIG. 6B is a partial cut away view of another embodiment of the constant temperature circulator assembly of FIG. 1.

FIG. 6B is a partial cut away view of another embodiment of the constant temperature circulator assembly 100 of FIG. 1. In this embodiment, the handle 136 on the latch 130 of the base ring 122 is actuated against the biasing element 132 such that the handle 136 is moved outwardly in the direction indicated by arrow 152. The tab 138 disengages one of the plurality of notches 120 disposed about the outer circumference of the projection 118 from the base 116 so that the base 116 may be moved through the range of orientation adjustment as indicated by arrow 154 to any one of the selected plurality of notches 120. One of ordinary skill in the art will recognize that the tab 138 will be biased against the circular projection 118 if the handle 136 is not continuously actuated and as a result, the next adjacent notch 120 will be engaged by the tab 138. In another embodiment, a sealing element 164, that may be configured as an o-ring or other suitable construction, may be disposed in a groove 166 disposed about an opening 168 in the container 104 that may be contiguous with the base ring 122 to facilitate a sealed connection between the base ring assembly 106 and the container 104 when the button 158 engages the opening 162 such that the slots 148 are secured to the standoffs 108.

Figure 7:
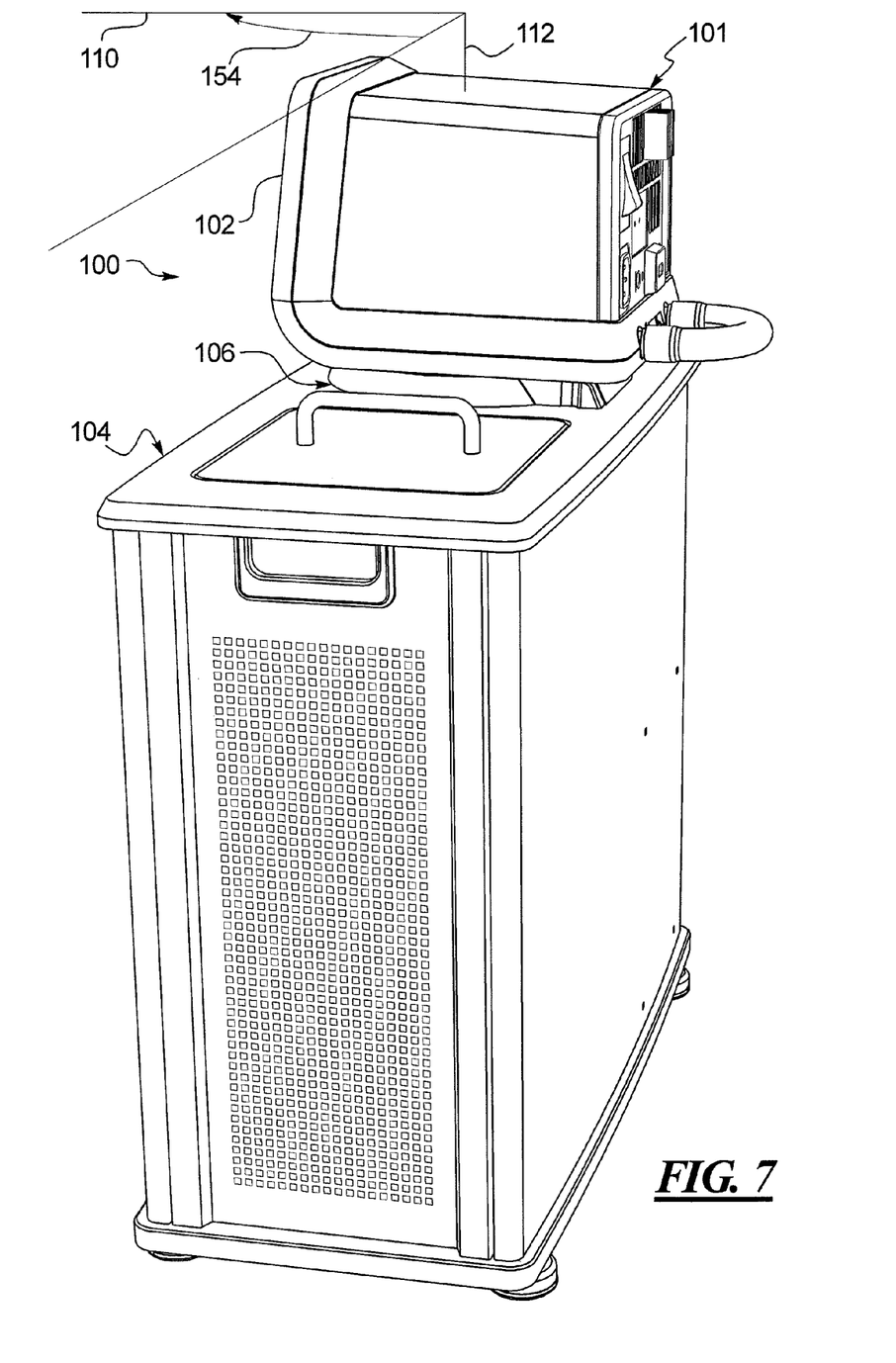
FIG. 7 is a perspective view of the constant temperature circulator assembly of FIG. 1 illustrating another embodiment of an orientation of a fixed display.
Figure 8:
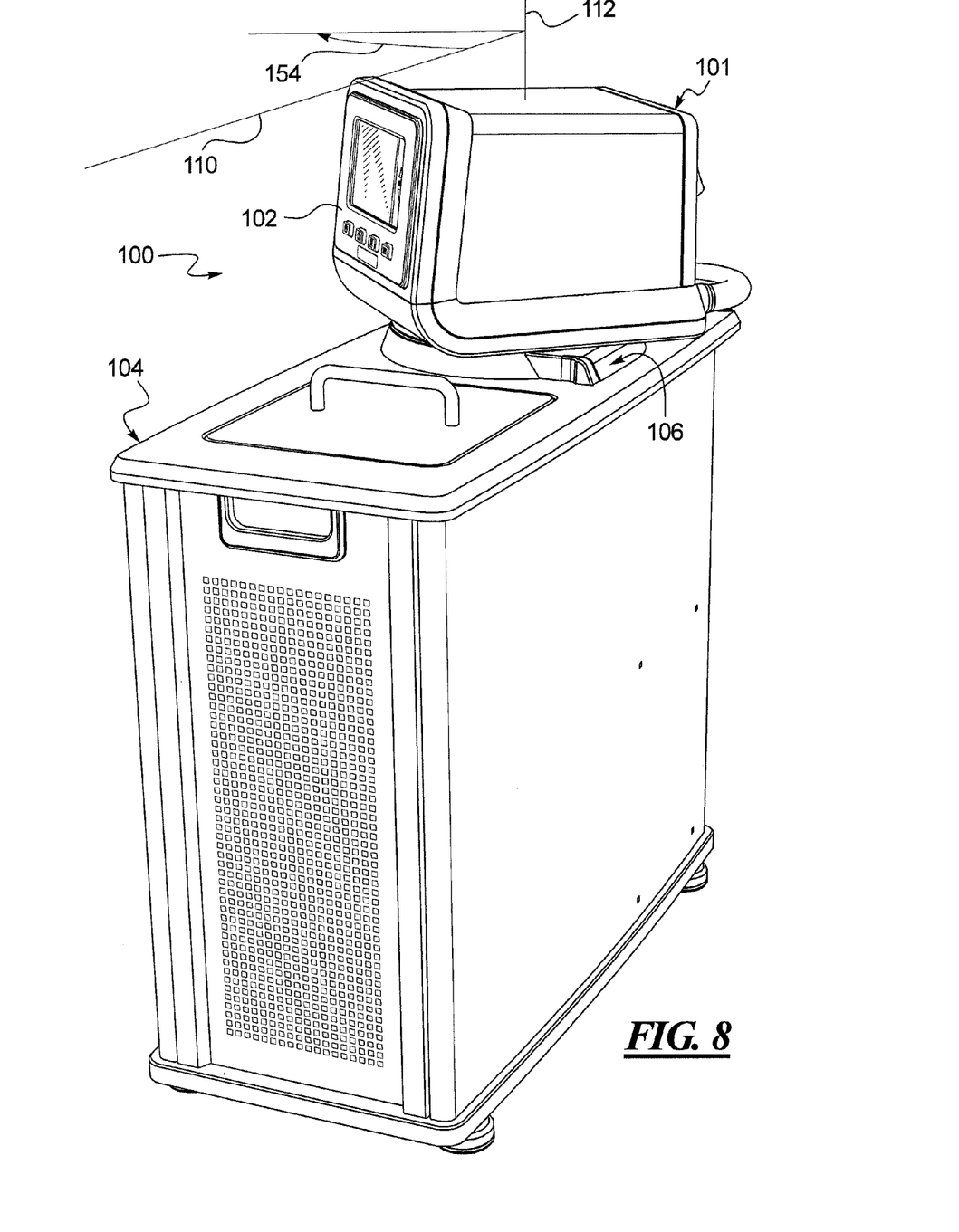
FIG. 8 is a perspective view of the constant temperature circulator assembly of FIG. 1 illustrating another embodiment of an orientation of a fixed display.

FIGS. 7 and 8 are perspective views of the constant temperature circulator assembly 100 of FIG. 1 illustrating other embodiments of the orientation 110 of the fixed display 102 and the range of adjustment 154 of the orientation 110.

The preceding detailed description is merely some examples and embodiments of the present disclosure and that numerous changes to the disclosed embodiments can be made in accordance with the disclosure herein without departing from its spirit or scope. The preceding description, therefore, is not meant to limit the scope of the disclosure but to provide sufficient disclosure to one of ordinary skill in the art to practice the invention without undue burden.

What is claimed is:

1. A constant temperature circulator assembly comprising: a container including a fluid disposed within the container, the container having an opening defined in a top wall; a base ring assembly connected to the top wall of the container; and a circulator head assembly including a housing, a display fixedly connected to the housing, a base connected to the housing, a projection defined in and extending from the base and a temperature adjusting element extending from the base, wherein the temperature adjusting element extends through the opening into the fluid and the projection is movably received within the base ring assembly so that an orientation of the fixed display may be selectively adjusted with respect to the base ring assembly, and wherein the base ring assembly includes a base ring including a central opening and a channel circumferentially disposed about the central opening and wherein the channel includes a mounting portion having a slot configured for locking engagement with a standoff disposed on the container.

2. The constant temperature circulator assembly as recited in claim 1, further comprising a standoff connected to the container for locking interface with the base ring assembly.

3. The constant temperature circulator assembly as recited in claim 1, wherein the projection includes a plurality of notches formed therein.

4. The constant temperature circulator assembly as recited in claim 1, wherein the base ring includes an outer wall having a radially extending release tab that facilitates rotation of the base ring to selectively couple a slot disposed in a mounting portion of the channel and a standoff disposed on the container.

5. The constant temperature circulator assembly as recited in claim 1, wherein the base ring includes a latch mechanism including a latch movably connected to the base ring and a biasing element.

6. The constant temperature circulator assembly as recited in claim 5, wherein the latch is pivotally connected to an outer wall of the base ring and biased toward the central opening by the biasing element.

7. The constant temperature circulator assembly as recited in claim 5, wherein the latch includes a handle that extends beyond an outer wall of the base ring to facilitate selective engagement of a tab disposed on the latch and one of a plurality of notches formed in a circular projection on the circulator head assembly when the circular projection is disposed in the channel.

8. The constant temperature circulator assembly as recited in claim 1, wherein the selective adjustment of the orientation is through at least 180 degrees of rotation.

9. A constant temperature circulator assembly consisting of: a circulator head assembly including a housing including a circular projection defined in and extending from a base of the housing, the projection including a plurality of notches defined in an outer surface thereof and disposed in pre-selected circumferentially spaced locations, a display fixedly connected to the housing; and a base ring assembly adapted for connection to a container, wherein the projection of the circulator head assembly is movably received within a channel circumferentially disposed about a central opening of the base ring assembly so that an orientation of the fixed display may be selectively adjusted with respect to the base ring assembly, wherein the base ring assembly includes a latch mechanism including a latch movably connected to the base ring assembly and a biasing element.

10. The constant temperature circulator assembly as recited in claim 9, wherein the channel includes a mounting portion having a slot configured for locking engagement with a standoff disposed on the container.

11. The constant temperature circulator assembly as recited in claim 9, wherein the base ring assembly includes an outer wall having a radially extending release tab that facilitates rotation of the base ring assembly to selectively couple a slot disposed in a mounting portion of the channel and a standoff disposed on the container.

12. The constant temperature circulator assembly as recited in claim 9, wherein the latch is pivotally connected to an outer wall of the base ring assembly and biased toward the central opening by the biasing element.

13. The constant temperature circulator assembly as recited in claim 9, wherein the latch includes a handle that extends beyond an outer wall of the base ring assembly to facilitate selective engagement of a tab disposed on the latch and one of the plurality of notches formed in the projection on the circulator head assembly when the circular projection is disposed in the channel.

14. The constant temperature circulator assembly as recited in claim 9, wherein the selective adjustment of the orientation is through at least 180 degrees of rotation.

15. A constant temperature circulator assembly including a circulator head assembly having a fixed display, the assembly comprising: a container; a base ring assembly connected to the container; and the circulator head assembly movably engaging the base ring assembly so that an orientation of the fixed display may be selectively adjusted with respect to the base ring assembly; wherein the base ring assembly includes a base ring including a central opening and a channel circumferentially disposed about the central opening and wherein the base ring includes an outer wall having a radially extending release tab that facilitates rotation of the base ring to selectively couple a slot disposed in a mounting portion of the channel and a standoff disposed on the container.

16. A constant temperature circulator assembly comprising a circulator head assembly having a fixed display and a base ring assembly adapted for connection to a container, wherein the circulator head assembly movably engages the base ring assembly so that an orientation of the fixed display may be selectively adjusted with respect to the base ring assembly; wherein the base ring assembly includes a base ring including a central opening and a channel circumferentially disposed about the central opening and wherein the base ring includes an outer wall having a radially extending release tab that facilitates rotation of the base ring to selectively couple a slot disposed in a mounting portion of the channel and a standoff.

17. A constant temperature circulator assembly consisting of: a circulator head assembly including a housing including a circular projection defined in and extending from a base of the housing, the projection including a plurality of notches defined in an outer surface thereof and disposed in pre-selected circumferentially spaced locations, a display fixedly connected to the housing; and a base ring assembly adapted for connection to a container, wherein the projection of the circulator head assembly is movably received within a channel circumferentially disposed about a central opening of the base ring assembly so that an orientation of the fixed display may be selectively adjusted with respect to the base ring assembly, wherein the selective adjustment of the orientation is through a range of at least 180 degrees of rotation.

* * * * *